United States Patent
Geysen

(10) Patent No.: US 11,261,030 B2
(45) Date of Patent: Mar. 1, 2022

(54) CONVEYOR BELT WITH UPRIGHT RIBS

(71) Applicant: Clean Conveyor Belt BVBA, Herselt (BE)

(72) Inventor: Alex Jean Geysen, Herselt (BE)

(73) Assignee: CLEAN CONVEYOR BELT BVBA, Herselt (BE)

( * ) Notice: Subject to any disclaimer, the term of this patent is extended or adjusted under 35 U.S.C. 154(b) by 0 days.

(21) Appl. No.: 16/991,447

(22) Filed: Aug. 12, 2020

(65) Prior Publication Data
US 2021/0047125 A1    Feb. 18, 2021

(30) Foreign Application Priority Data

Aug. 12, 2019 (BE) .................................. 2019/5523

(51) Int. Cl.
*B65G 15/64* (2006.01)
*B65G 15/42* (2006.01)

(52) U.S. Cl.
CPC .............. *B65G 15/64* (2013.01); *B65G 15/42* (2013.01)

(58) Field of Classification Search
None
See application file for complete search history.

(56) References Cited

U.S. PATENT DOCUMENTS 3,308,929 A * 3/1967 Shriver ................ B65G 39/071
198/840
4,321,996 A  3/1982 Sancken et al.
5,320,214 A * 6/1994 Kordis .................... B65G 15/64
198/750.1
7,673,741 B2 * 3/2010 Nemedi ................. B65G 15/62
198/841

FOREIGN PATENT DOCUMENTS

| EP | 2 944 587 | 11/2015 |
|---|---|---|
| EP | 3 372 537 | 9/2018 |
| JP | H04-37116 | 3/1992 |
| JP | 2000-351432 | 12/2000 |
| JP | 2005-212989 | 8/2005 |
| WO | 2014/013472 | 1/2014 |

OTHER PUBLICATIONS

Belgian Search Report for Belgian Patent Application No. 201905523 dated Aug. 12, 2019, 3 pages.
Written Opinion for Belgian Patent Application No. 201905523 dated Aug. 12, 2019, 3 pages.

* cited by examiner

*Primary Examiner* — Kavel Singh
(74) *Attorney, Agent, or Firm* — Nixon & Vanderhye

(57) ABSTRACT

Conveyor belt system with a conveyor belt which extends between a first roller and a second roller so that the conveyor belt has a transport side and a return side, wherein the conveyor belt system further comprises a frame for positioning the conveyor belt, characterized in that the conveyor belt has an upright rib at the position of each of its two transverse ends, which upright ribs extend in the longitudinal direction over substantially the whole conveyor belt, wherein the frame has at the position of the two transverse ends and at least at the position of the transport side a groove in which the upright ribs are received.

10 Claims, 4 Drawing Sheets

CONVEYOR BELT WITH UPRIGHT RIBS

This application claims priority to BE Patent Application No. 2019/5523 filed Aug. 12, 2019, the entire contents of each of which are hereby incorporated by reference.

BACKGROUND OF THE INVENTION

Field of the Invention

The invention relates to a conveyor belt system. The invention relates more specifically to a conveyor belt system for bulk materials.

Description of the Related Art

Conveyor belts are much used to move materials between a first location and a second location. The invention relates particularly here to conveyor belts which are adapted to transport bulk materials, also known as bulk cargo or bulk goods. These are materials which are not packed, loaded and transported individually, such as containers, pallets or boxes, but which are deposited in a loading space, processed and transported in bulk. The invention is more particularly optimized for the transport of bulk materials with fine particles. Examples hereof are sand, powder, glass dust. Where the word 'materials' is used in the remainder of the description, this is understood to mean bulk materials as described above. The materials comprise multiple particles, grains or particulate. A conveyor belt typically extends at least partially flat so that the materials remain on the conveyor belt primarily due to the force of gravity. This does not preclude a conveyor belt from having an angle of inclination. A conveyor belt can thus have an angle of inclination of up to about 60 degrees, preferably up to about 40 degrees. This means that the conveyor belt can extend both horizontally and at an incline.

For the transport of materials a conveyor belt is provided with an operating zone on which the materials are provided. It is difficult, particularly when the materials comprise small particles, to hold all particles inside the operating zone. The particles which come to lie outside the operating zone form contaminants which can adversely affect the operation of the conveyor belt.

EP 2 944 587 describes a conveyor belt system which provides a solution to the above described problem. This document describes a conveyor belt system with a frame and the conveyor belt protrudes on either side through the walls of the frame so that the sides of the conveyor belt are situated outside the frame. Because the conveyor belt lies with its edges outside the frame, contaminants falling via the side off the conveyor belt will not come to lie inside the frame. The structure of the construction prevents with certainty the possibility of contaminants coming into contact with drive elements located in the frame of the conveyor belt system. This considerably reduces the chance of wear and/or blockage of the conveyor belt.

U.S. Pat. No. 7,673,741 describes a conveyor belt system wherein the conveyor belt is provided with a thickened portion at the position of its two transverse ends. This thickened portion is received in a groove of the frame. Owing to this structure, materials such as wet chips can be transported, wherein water from the chips is prevented from being able to contaminate components of the conveyor belt.

SUMMARY OF THE INVENTION

It is an object of the invention to provide a conveyor belt system with an improved operation.

The invention provides for this purpose a conveyor belt system with a conveyor belt which extends between a first roller and a second roller so that the conveyor belt has a transport side and a return side, wherein the conveyor belt system further comprises a frame for positioning the conveyor belt, wherein the conveyor belt has a central zone which is demarcated by two upright ribs, which upright ribs extend in the longitudinal direction over substantially the whole conveyor belt, wherein the frame has at least at the position of the transport side and at the position of the two transverse ends a groove in which an upright rib is in each case received, characterized in that each upright rib is situated at a distance from an edge of the conveyor belt so that two further zones of the conveyor belt are situated outside the ribs.

The conveyor belt system has a conveyor belt on which materials, usually bulk materials, can be placed in order to transport the bulk materials from a beginning of the conveyor belt to an end of the conveyor belt. For this purpose the conveyor belt extends between a first roller and a second roller. At least one of the rollers is driven. The upper side of the conveyor belt is referred to as the transport side, while the underside of the conveyor belt is the return side. The conveyor belt is formed by an endless belt which is tensioned between the first roller and the second roller.

The invention is based on the insight that two upright ribs can be provided on the conveyor belt in order to demarcate a central zone. The two upright ribs extend in the longitudinal direction over substantially the whole conveyor belt. The conveyor belt system further has a frame to which the first roller and second roller are connected. The frame is intended for positioning of the conveyor belt. For this purpose the frame provides two grooves in which the upright ribs can be received. Because the grooves receive the upright ribs, movement of the conveyor belt in the transverse direction thereof is prevented. In other words, the conveyor belt is positioned and held in its transverse direction by the combination of grooves and upright ribs. The upright ribs can move in the grooves in the longitudinal direction, such that the conveyor belt is drivable.

The upright ribs further form a barrier for the bulk materials. During transport, particles situated at the edge of the central zone tend to move towards the transverse end of the conveyor belt. The upright ribs form a barrier hereto. Because the upright ribs move in a groove, the combination of the groove and the upright ribs forms a raised barrier. The combination of the groove and the upright ribs increases the resistance to undesired lateral outflow of material. Because the upright ribs lie at a distance from the edge of the conveyor belt, two further zones of the conveyor belt are formed, situated on either side of the central zone. These further zones ensure that dirt or particles that still pass the barrier of the upright rib and groove cannot block the transport system. This is because these impurities come to lie on the further zones, outside the groove, and can there be manipulated further if necessary. Owing to its specific construction, the transport system according to the invention provides for an improved positioning of the conveyor belt in the system, an increased resistance to undesired lateral outflow and for an improved cleaning of the conveyor belt system.

The transport side of the conveyor belt is preferably supported at least at the position of the two transverse ends by a support surface element, which support surface element forms part of the frame and extends over substantially the whole transport side. The support surface element preferably lies opposite the groove so that the conveyor belt is caught with the upright rib between the support surface element and the groove.

The support surface element preferably extends over substantially the whole width of the conveyor belt. The groove is preferably provided in a block which extends over substantially the whole transport side. The block preferably comprises a height-adjusting mechanism for positioning the block relative to the conveyor belt in the height direction. The height-adjusting mechanism is preferably adjustable in order to set a predetermined height.

The conveyor belt preferably has at the position of the two transverse ends two upright ribs extending parallel to each other and at a distance from each other in the longitudinal direction over substantially the whole conveyor belt. Two ribs not only double the resistance to undesired lateral outflow of material. Providing two ribs also makes it possible to selectively choose in the frame which of the two ribs will be used to position the conveyor belt.

The frame preferably has at the position of the two transverse ends and at least at the position of the transport side a further groove parallel to the groove, such that the parallel ribs are received in the groove and the further groove. Along the transport side the two ribs are preferably both received in a groove in order to increase the resistance to undesired lateral outflow of material. Only the outer groove will then preferably continue at the end of the transport side in order to ensure the positioning of the conveyor belt, while expulsion of the bulk material is facilitated. Even material that has passed the first barrier, formed by the inner rib and groove, can still be expelled in simple manner when the expulsion zone has only the second groove.

The frame preferably has at the position of the return side a further support surface element at least at the position of the two transverse ends of the conveyor belt, which further support surface element has at least one return groove for the upright ribs.

The frame preferably has at least two upright walls at the position of opposite transverse ends, which two upright walls are formed such that at the position of the return side the conveyor belt falls within the two upright walls and that at the position of the transport side the conveyor belt extends with each of its two transverse ends through an elongate opening of the wall. The groove is preferably provided at the position of the elongate opening of the wall. Material or contaminants which were to still pass the one or more barriers formed by upright rib and groove come to lie outside the upright wall. Because the return side falls wholly within these walls, these contaminants cannot reach and contaminate the return side of the conveyor belt. This keeps the conveyor belt clean.

A guard is preferably provided in order to shield the two transverse ends extending through the elongate opening from a surrounding area. The guard is preferably removable. The guard increases safety, the conveyor belt is shielded from the surrounding area. Making the guard removable or at least partially removable enables easy cleaning and maintenance of the conveyor belt system.

The conveyor belt preferably comprises carriers formed by upright structures which are positioned in a middle zone of the conveyor belt, at a distance from the upright ribs. The carriers can be formed in accordance with the angle of inclination of the conveyor belt and in accordance with the type of material that will be transported by the conveyor belt.

BRIEF DESCRIPTION OF THE DRAWINGS

The invention will now be further described on the basis of an exemplary embodiment shown in the drawings.

In the drawings.

DESCRIPTION OF THE PREFERRED EMBODIMENTS

Figure 1:
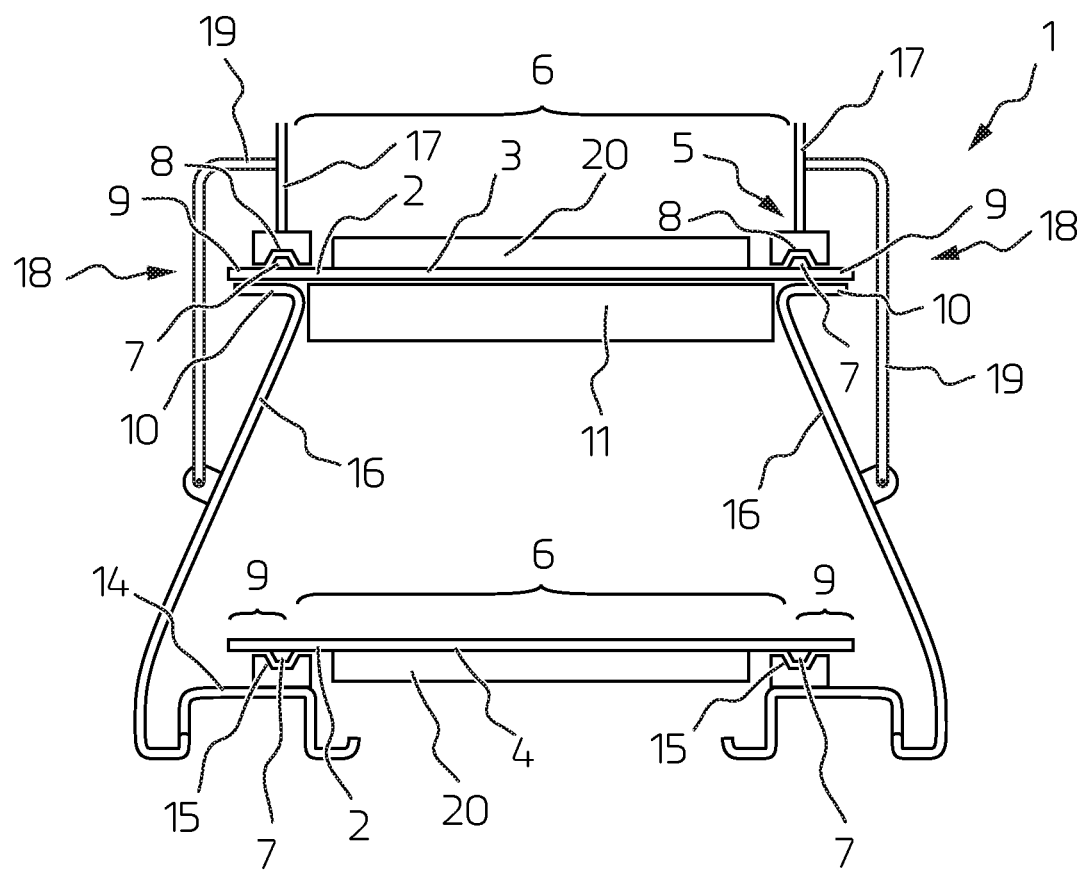
FIG. 1 shows a cross-section of a transport system according to a first embodiment of the invention.

The same or similar elements are designated in the drawing with the same reference numeral.

FIG. 1 shows a cross-section of a conveyor belt system 1 according to a first embodiment of the invention. In this first embodiment the conveyor belt system 1 has a conveyor belt 2 on which an upright rib 7 is formed on either side. The upright ribs 7 demarcate a central zone 6, which central zone 6 forms the primary operating zone of conveyor belt 2. Because conveyor belt 2 is tensioned as endless belt between a first roller and a second roller, the transport side 3 and the return side 4 of conveyor belt 2 are visible in cross-section.

The transport side 3 is the upper side of conveyor belt 2. Materials are placed on transport side 3, which materials are carried from an inlet to an outlet by movement of conveyor belt 2. This is further described hereinbelow. The materials are placed in the central zone 6 of conveyor belt 2, as seen in transverse direction. This central zone is demarcated by opposite upright ribs 7. It is an object of transport system 1 to hold materials inside central zone 6 to maximum extent. This prevents materials from coming to lie outside central zone 6 in the transverse direction. When materials, parts thereof or other particles still come to lie outside central zone 6, they are deemed contaminants. It is a further object of the conveyor belt system to ensure that contaminants do not block conveyor belt system 1. More specifically, it is an object to ensure that contaminants are unable to accumulate and/or adversely affect the operation of the conveyor belt system. Conveyor belt 2 is provided for this purpose with further zones 9 which are situated on either side of central zone 6 in the transverse direction. In other words, a further zone will be situated between the upright rib 7 and the edge of conveyor belt 2. This further zone has a width of at least 2 cm, preferably at least 4 cm, more preferably at least 6 cm, most preferably at least 10 cm. The further zones 9 together preferably have a width amounting to at least 5% of the width of central zone 6, preferably at least 10%, more preferably at least 15%.

Transport system 1 further has a frame 5 which holds the conveyor belt. Conveyor belt 2 is positioned relative to frame 5. Via frame 5 the conveyor belt can be integrated into a greater whole of a material transport and/or material processing installation. Frame 5 has upright walls 16 which form the side walls of conveyor belt system 1. These upright walls 16 can be continuous or be interrupted in the longitudinal direction. FIG. 1 shows the upper part of upright wall 17, which is separate of the lower part of upright wall 16. Provided between upper part 17 and lower part 16 is an elongate opening 18. Conveyor belt 2 extends on either side through the elongate opening 18. The transport side 3 of conveyor belt 2 hereby extends to a position outside the upright walls 16 and 17 of frame 5. This has the result that when contaminants come to lie outside central zone 6, these contaminants come to lie on one of the further zones 9 and are there situated at least partially outside upright walls 16 and 17 of frame 5. If the contaminants were to accumulate there, they accumulate outside the boundaries of frame 5. Because the contaminants are situated outside frame 5, accumulation of contaminants cannot cause blockage of conveyor belt 2, since conveyor belt 2 lies primarily inside frame 5. Upright walls 16 are therefore formed to fully enclose the return side 4 of conveyor belt 2. As described above, the transport side 3 of conveyor belt 2 is enclosed only partially by the upright walls.

The upright ribs 7 are provided over at least a portion of transport side 3 and return side 4 in a groove 8. Groove 8 is preferably formed in a block 12, which is further discussed in detail hereinbelow. By having the upright rib run in a groove the transverse position of the conveyor belt is predetermined. Groove 8 and rib 7 are complimentary in order to allow a movement of the rib relative to the groove in the longitudinal direction thereof, while a movement of the rib relative to the groove in at least one and preferably both transverse directions is prevented. A clearance can of course be provided here in order to enable some movement of the rib in the transverse direction. Build-up of stresses can hereby for instance be avoided. The resistance of movement in the longitudinal direction of the rib can also be reduced by allowing a predetermined clearance. The upper upright wall 17 is preferably provided, as seen in the transverse direction of conveyor belt 2, at the position of the upright rib 7. This allows groove 8 to be formed on an underside of the upper upright wall 17.

Provided under conveyor belt 2, more specifically under the transverse ends of conveyor belt 2, is a support surface element 10. Support surface element 10 provides for a support for conveyor belt 2. By providing support surface element 10 under the transverse ends the support surface element 10 extends under upright ribs 7 of conveyor belt 2. Rollers 11 can be provided under central zone 6 of the conveyor belt for the purpose of supporting belt 2. Alternatively, support surface element 10 can extend over substantially the whole width of conveyor belt 2 in order to fully support conveyor belt 2. Support surface element 10 can be formed as a continuous plate, whereby a continuous surface is obtained. Alternatively, support surface element 10 can be formed by a perforated plate or a grating. A support of the conveyor belt is hereby on the one hand obtained, but so is a reduction of slide resistance. Cooling of the conveyor belt also becomes simpler when a plate with perforations or a grating is used as support surface element 10 for supporting conveyor belt 2.

Support surface element 10 preferably lies at least directly below groove 8. Support surface element 10 will hereby support conveyor belt 2, at least at the position of groove 8. Owing to the support surface element, rib 7 can be positioned with sufficient accuracy relative to groove 8 to achieve an optimal operation. It will be apparent here that the operation of groove 8 and rib 7 relate to both the positioning of conveyor belt 2 in the transverse direction relative to frame 5 and relate to preventing materials from coming to lie outside central zone 6. This is because upright rib 7 and groove 8 will also form a resistance to undesired movement of particles in the transverse direction beyond central zone 6. In other words, particles will not be able to move easily over upright rib 7 and through groove 8.

In the embodiment of FIG. 1 the frame parts extending above transport side 3 of conveyor belt 2 are connected via hinge mechanism 19 to the frame parts situated under transport side 3. This hinge mechanism 19 allows the upper walls 17 to be pivoted outward, whereby the blocks with grooves 8 can also be moved away from the conveyor belt. This results in the conveyor belt lying completely clear on the upper side, and cleaning and maintenance can hereby be performed in simple manner. Hinge mechanism 19 can be formed as a continuous plate so that the hinge mechanism also fulfils a shielding function. Hinge mechanism 19 is preferably formed by a plurality of connecting elements which connect the frame parts. The connecting elements are placed at a predetermined maximum distance from each other in the longitudinal direction of the conveyor belt in order to give the frame a sufficiently great strength.

Connecting the frame parts which are situated above and below transport side 3 of conveyor belt 2 via hinge mechanism 19 enables the conveyor belt to extend, at the position of the transport side, in the transverse direction to a position outside the frame. This can be directly, in that the conveyor belt itself is wider than the frame at the position of the transport side, or indirectly in that a plate which extends further to a position outside the frame is provided under the conveyor belt. In both cases contaminants which come to lie to the side of the conveyor belt can be discharged out of the frame. These contaminants hereby cannot have an adverse effect on the operation of the conveyor belt.

The frame is preferably provided at the position of the transport side 3 of conveyor belt 2 with guards (not shown). The guards are preferably provided on the outer side of upright walls 16 and 17 in order to shield the elongate opening 18. This further increases the safety of the conveyor belt. It also becomes possible to collect contaminants inside the guard so that they do not cause unnecessary contamination of the surrounding area. The guard can be pivotally connected in order to provide easy access to elongate opening 18. This increases the convenience of use and allows maintenance, for instance cleaning, in simple manner.

Frame 5 can also be provided on the underside with return grooves 15 in which are received ribs 7, which extend downward at the position of the return side. The conveyor belt can hereby also be positioned inside frame 5 in the transverse direction at the position of return side 4. It will be apparent from FIG. 1 that that it is impossible for contaminants which drop off conveyor belt 2 on transport side 3 to end up on return side 4 of the conveyor belt. This is because upright walls 16 prevent this. This is because upright walls 16 are formed such that the return side is wholly enclosed by walls 16, while the transport side protrudes to a position outside upright walls 16 on either side. In this context it will be apparent that it is not essential for conveyor belt 2 itself to extend to a position outside upright walls 16 on transport side 3. Conveyor belt 2 can be situated within these upright walls 16, while support surfaces extending to a position outside upright walls 16 are formed under conveyor belt 2. The support surfaces then function as an extension of the conveyor belt in the transverse direction for the purpose of guiding contaminants to a position outside upright walls 16.

Figure 2:
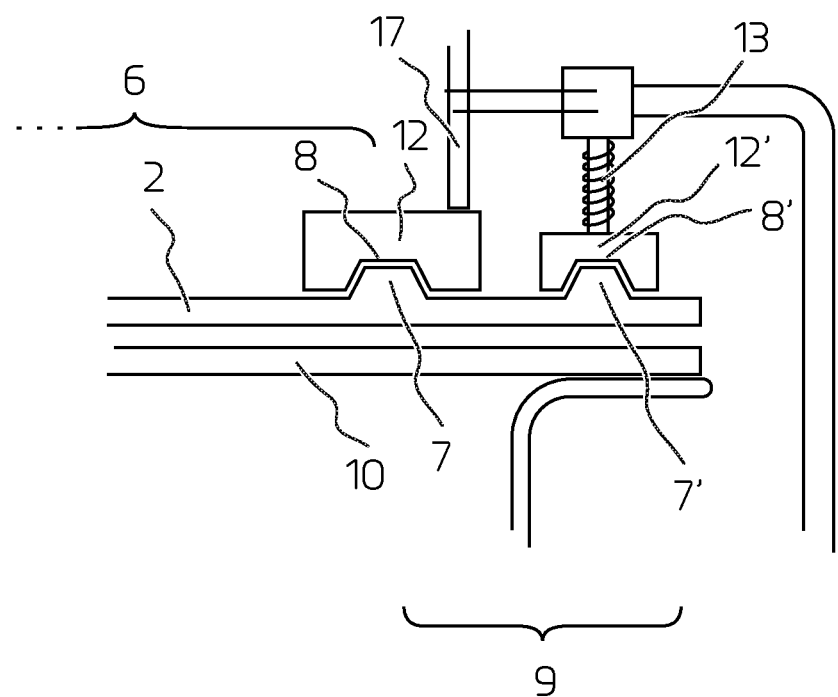
FIG. 2 shows a cross-section of an edge of a conveyor belt according to another embodiment of the invention.

FIG. 2 shows a detail of a cross-section of transport system 1 at the position of the transverse end of the transport side 3 of conveyor belt 2. The figure shows here a further embodiment in which two parallel upright ribs are provided on each transverse end of conveyor belt 2. Providing two upright ribs increases the resistance to outflow of contaminants and simplifies the positioning further. FIG. 2 shows that a first upright rib 7 is received in a first groove 8. First groove 8 is formed in a block 12 which is connected to upper wall 17. In this embodiment support surface element 10 extends under the conveyor belt over substantially the whole width thereof.

In FIG. 2 a further upright rib 7' is formed parallel to upright rib 7. In this embodiment the further upright rib 7' takes an identical form to upright rib 7. In other words, each upright rib is formed as a pair of ribs, and a pair of ribs, which are preferably identical, is provided on each transverse end of the conveyor belt. Alternatively, the further upright rib 7' can be formed differently in cross-section, for instance have a different height, different width or different shape than upright rib 7.

The further upright rib 7' is provided in a further groove 8'. The further groove 8' is formed in a further block 12'. In this embodiment further block 12' is connected via a height-adjusting mechanism 13 to the upright wall 17 of frame 5. A height of the further groove 8' relative to the further rib 7' can be adjusted via height-adjusting mechanism 13. The height-adjusting mechanism allows an optimal balance to be found between, on the one hand, resistance created by further rib 7' moving in further groove 8' in the longitudinal direction and, on the other hand, the operational advantages of a tight connection of rib and groove. It will be apparent to the skilled person that the higher the further block 12' is positioned relative to further upright rib 7', the worse the seal against contaminants, but the lower the slide resistance during use of the conveyor belt will be. An optimal height can be set via the height-adjusting mechanism 13.

In this embodiment only one block 12 is mounted via a height-adjusting mechanism 13. It will be apparent that it is also possible for both blocks 12 and 12' to be connected via a similar height-adjusting mechanism 13 to frame 5. In this embodiment block 12 and 12' are also shown as two separate components. In practice it is possible to form grooves 8 and 8' in one block or profile. In this embodiment the inner of the two blocks 12 is connected to upright wall 17. It will be apparent that it is also possible to envisage an embodiment wherein the outer of the two blocks 12' is connected to upright wall 17, while the inner of the two blocks is connected indirectly, for instance via a height-adjusting mechanism 13, to the upright wall.

FIGS. 1 and 2 show embodiments in which groove 8 is formed to substantially wholly enclose the rib. A groove can however also be formed to partially enclose a rib, wherein groove 8 extends only partially around a rib. FIG. 2 further shows that a further zone 9 is deemed to be the portion of the conveyor belt that is situated between the inner of the parallel ribs and the edge of conveyor belt 2. This is because the inner of the parallel ribs will demarcate the central zone 6.

Figure 3:
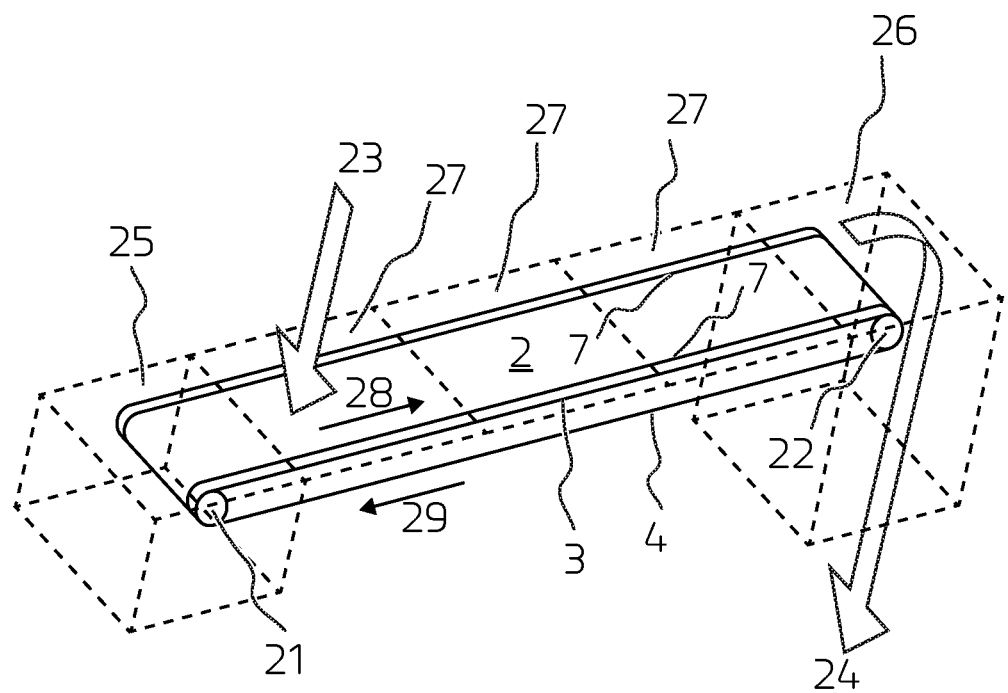
FIG. 3 shows a perspective view of a modular construction of a transport system according to another aspect of the invention.

FIG. 3 shows a schematic perspective view of a conveyor belt system 1 according to an embodiment of the invention. In conveyor belt system 1 conveyor belt 2 extends between a first roller 21 and second roller 22. First roller 21 is formed in a first end module 25. Second roller 22 is formed in a second end module 26. The second end module 26 comprises the outlet 24 so that the materials which come to lie at the end of the transport side of conveyor belt 2 drop off the conveyor belt. This typically takes place at the position of second roller 22 which is provided in second end module 26. Arrow 24 shows the outlet of conveyor belt system 1. The inlet 23 can be formed at the position of first end module 25. Inlet 23 is however preferably formed in the segment adjacent to first end module 25. This allows first end module 25 to be provided with for instance systems for tensioning of conveyor belt 2. For this purpose first roller 21 is preferably mounted displaceably in first end module 25, in the longitudinal direction of conveyor belt 2, such that the tension on conveyor belt 2 can be set and adjusted by displacing first roller 21.

The conveyor belt has a transport direction 28. Transport direction 28 is the direction in which the transport side of conveyor belt 2 moves in frame 5. Return side 4 will then move in a return direction 29. When materials are deposited on conveyor belt 2 via inlet 23, the movement of conveyor belt 2 in transport direction 28 will ensure that the materials are carried to second roller 22. Materials will there drop, typically due to the force of gravity, under the conveyor belt. This is deemed the outlet 24 of the transport system. At the position of outlet 24 mechanisms can be provided for facilitating the dropping of the materials off the conveyor belt. Air injectors can for instance be provided to blow materials off the conveyor belt. Scrapers can alternatively be provided for the purpose of scraping the materials off the conveyor belt. The conveyor belt system is preferably constructed with a plurality of modules 27. The modules 27 are intermediate modules which are located between first module 25 and second module 26. The length of conveyor belt system 1 can be adjusted depending on the number of intermediate modules 27. Intermediate modules 27 can preferably be coupled. Each intermediate module 27 is constructed for instance with a cross-section as shown in FIG. 1.

Figure 4:
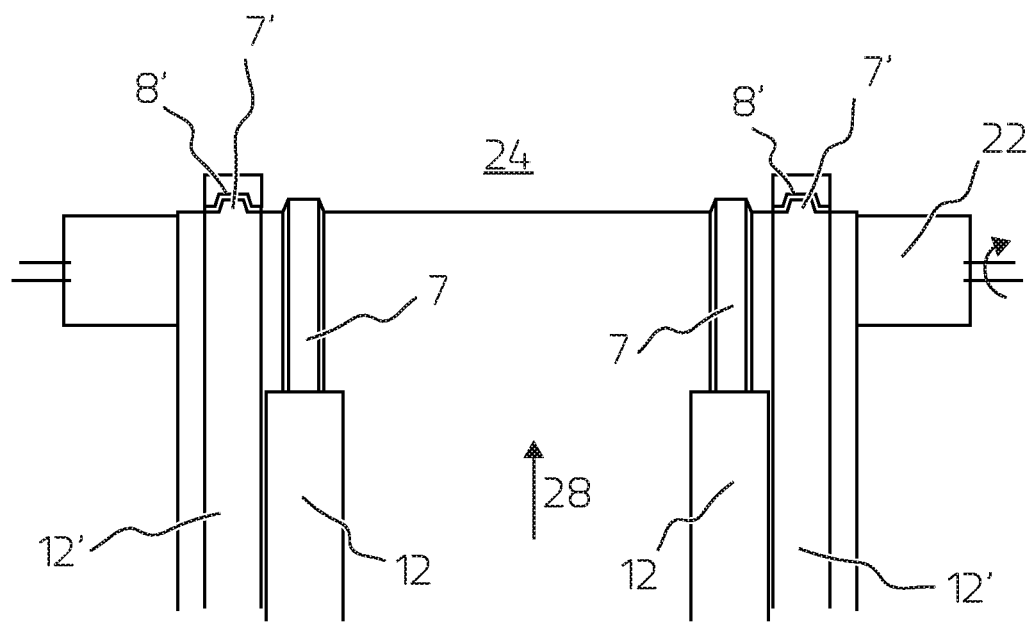
FIG. 4 shows a top view of an end module of the transport system of FIG. 3.

FIG. 4 shows a top view of a preferred embodiment of an end module 26. FIG. 4 illustrates here that conveyor belt 2 runs over a second roller 22. The conveyor belt has two ribs 7 and 7' on each of its transverse ends. Central zone 6 is situated between the inner of the two parallel ribs, designated with reference numeral 7. Block 12, in which lies groove 8 in which the inner of the two parallel ribs 7 runs, preferably stops at a distance from second roller 22. The further block 12', in which is formed further groove 8' in which the further upright rib 7' of the parallel ribs runs, preferably extends continuously over second roller 22. The effects hereof are described below. At the position of intermediate modules 27 the two upright ribs 7 and 7' run in corresponding grooves 8 and 8'. The two upright ribs will hereby form a resistance to outflow of contaminants via the transverse side of the conveyor belt. While contaminants have some likelihood of still being able to move beyond inner rib 7, it is highly unlikely that contaminants will cross both ribs 7 and 7'. It is therefore not unlikely in practice that, at the position of end roller 27, contaminants, particles or parts of the materials lie between the two parallel ribs 7 and 7'. By having block 12 stop before second roller 22 materials will drop from the central zone off the conveyor belt to the outlet, and contaminants which have come to lie at the position of the first rib or between first rib 7 and second rib 7' will also drop down at the position of outlet 24. This gives the transport system a self-cleaning action.

In an outlet zone of the transport system, this being the zone of the conveyor belt at the position of second roller 22 as seen in its length, the operating zone is widened relative to the primary operating zone, which is formed by central zone 6. Some of the materials which have come to lie outside central zone 6 can hereby still be recuperated at outlet 24 and also discharged from conveyor belt 2. The inner blocks preferably extend at maximum to a position at second roller 22. The blocks preferably extend to a position a minimum distance of 10 cm away from second roller 22. Where inner blocks 12 stop, an operating transition is created in which the operating width of the conveyor belt is increased. Before the operating transition the operating width is equal to the width of central zone 6. Beyond the operating transition the operating width is greater than the width of the central zone. Beyond the operating transition the operating width is determined by the central zone plus the upright ribs 7 plus the zone between the two parallel ribs 7 and 7'.

Conveyor belt 2 can be provided in its central zone with upright carriers 20. Carriers can be formed as upright ribs extending transversely over conveyor belt 2.

The skilled person will appreciate on the basis of the description above that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A conveyor belt system comprising:
   a conveyor belt;
   a first roller;
   a second roller,
      wherein the conveyor belt extends between the first roller and the second roller so that the conveyor belt has a transport side and a return side; and
   a frame for positioning the conveyor belt,
   wherein the conveyor belt has a central zone which is demarcated by two upright ribs, the upright ribs extending in a longitudinal direction over substantially the whole conveyor belt,
   wherein the frame has at least at the position of the transport side and at the position of the two transverse ends a groove in which an upright rib is in each case received,
   wherein each upright rib is situated at a distance from an edge of the conveyor belt so that two further zones of the conveyor belt are situated outside the ribs,
   wherein the groove is provided in a block which extends over substantially the whole transport side, and
   wherein the block comprises a height-adjusting mechanism for positioning the block relative to the conveyor belt in the height direction.

2. The conveyor belt system according to claim 1, wherein the transport side of the conveyor belt is supported at least at the position of the two transverse ends by a support surface element, which support surface element forms part of the frame and extends over substantially the whole transport side.

3. The conveyor belt system according to claim 2, wherein the support surface element extends over substantially the whole width of the conveyor belt.

4. The conveyor belt system according to claim 1, wherein the height-adjusting mechanism is adjustable in order to set a predetermined height.

5. The conveyor belt system according to claim 1, wherein provided on each side of the central zone are two upright ribs extending parallel to each other and at a distance from each other in the longitudinal direction over substantially the whole conveyor belt.

6. The conveyor belt system according to claim 1, wherein the frame has at the position of the two transverse ends and at least at the position of the transport side a further groove parallel to the groove, such that the parallel ribs are received in the groove and the further groove.

7. The conveyor belt system according to claim 1, wherein the frame has at the position of the return side a further support surface element at least at the position of the two transverse ends of the conveyor belt, which further support surface element has at least one return groove for the upright ribs.

8. The conveyor belt system according to claim 2, wherein the conveyor belt comprises carriers formed by upright structures which are positioned in the central zone of the conveyor belt, at a distance from the upright ribs.

9. The conveyor belt system according to claim 2, wherein provided on each side of the central zone are two upright ribs extending parallel to each other and at a distance from each other in the longitudinal direction over substantially the whole conveyor belt.

10. The conveyor belt system according to claim 3, wherein provided on each side of the central zone are two upright ribs extending parallel to each other and at a distance from each other in the longitudinal direction over substantially the whole conveyor belt.

* * * * *